Oct. 17, 1950     E. BODMER     2,525,857

WORKPIECE SUPPORT

Filed Sept. 5, 1945

INVENTOR
ERNEST BODMER,

BY

ATTORNEY

Patented Oct. 17, 1950

2,525,857

UNITED STATES PATENT OFFICE 2,525,857

WORKPIECE SUPPORT

Ernest Bodmer, Grand-Lancy-Geneva, Switzerland, assignor to Tarex S. A., Geneva, Switzerland, a corporation of Switzerland Application September 5, 1945, Serial No. 614,568
In Switzerland January 4, 1945

4 Claims. (Cl. 279—35)

Fittings and other pieces having machinings effected according to axes of rotation forming angles with each other, are at present machined by means of special lathes having a fixed work-supporting spindle and tools effecting a movement of rotation around the spindle. The lathes with rotating tools have been developed to obviate the great difficulties which are incurred in fixing a piece of this type on the rotating spindle of a lathe.

It is evident that these lathes, with rotating tools, are costly and take up much room, and particularly that each type of lathe with rotating tools can only be used for machining pieces of the same family or possessing at least a certain number of features in common. This method of manufacture is certainly far from being rational, since it is impossible to machine simultaneously at several places on the same end of the piece, and this has of course an unfavourable influence on the total machining time for the piece. In addition, the piece being fixed and the tool rotating, it is practically impossible to obtain the precision of concentricity at present demanded, so that in many cases it is necessary to machine each piece by separate operations, fixing the piece by hand in the chuck of a lathe with rotating work-piece spindle. Such machining is extremely costly, but it is the only method which allows the demanded precision of concentricity to be realised approximately. It is, however, evident that this manner of working does not allow all the machining at each end of a piece to be effected according to the same axis or according to axes of rotation forming precise given angles. Nevertheless, the lathes with rotating tools are, in spite of everything, those which give the best results to-day and allow the best selling prices to be quoted.

The object of the present invention is a method of manufacturing pieces of the type indicated above, in which the machining operations are divided into phases of operations, each phase comprising several machining operations to be effected according to the same axis of rotation, these different phases of operations being effected successively on an automatic lathe with rotating work-piece spindle. This method tends to avoid the inconveniences of the methods at present known and cited above, and consists in placing the piece, for each new phase of operations, in a support and in inserting this latter on an automatic loading device of the rotating spindle of the lathe, a part concentric with the axis of rotation of the machinings of the desired phase of operations being provided on the support to cooperate with the clamping members of the spindle, with a view to firmly connecting this support to the spindle in a position concentric with the axis of the spindle, means being provided to clamp the piece in the support and render it immovable.

A further object of the invention is a device for putting the method into practice. This device comprises a support constituted by at least two shells hollowed out in such a manner as to allow them to accommodate the piece to be machined and having members allowing the support to be loaded on a loading device of the rotary spindle of the automatic lathe, this support having a part coaxial with the axis of rotation of the machinings of the phase of operations in question, this part being intended to be fixed in the clamping members of the spindle, the shells having in addition parts intended to come into contact with the piece to be machined and provided in such a way as to render the piece immovable with respect to the support.

The accompanying drawing shows diagrammatically and by way of example two variants of execution of the device for putting the method into practice.

Figure 1:
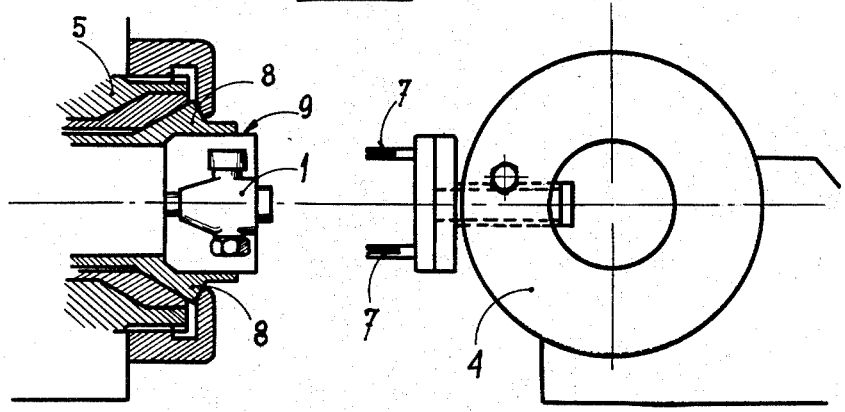
Fig. 1 illustrates the loading of the support in the clamping members of the spindle.
Figure 2:
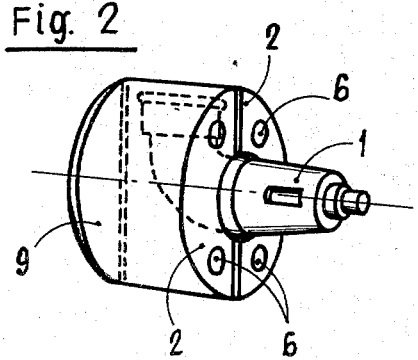
Fig. 2 is a perspective view of a first form of execution of the support, the piece to be machined being placed in the support.
Figure 3:
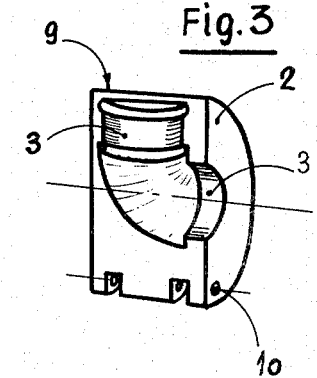
Fig. 3 is a view of one shell of the support shown in Fig. 2.
Figure 4:
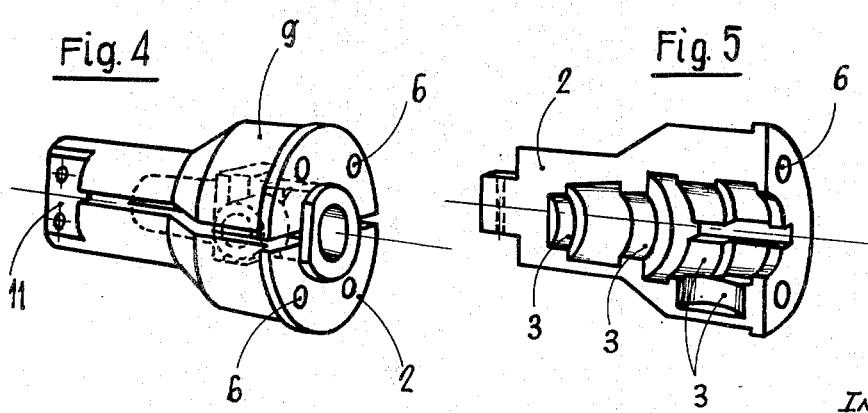
Fig. 4 is a perspective view of a second form of execution of the support, a piece being placed in the latter.
Figure 5:
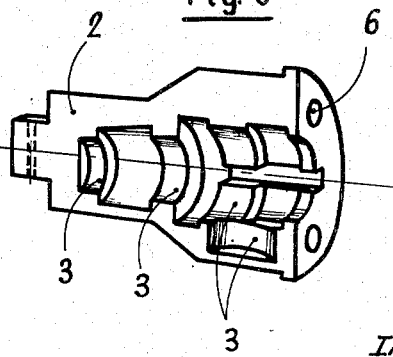
Fig. 5 is a view of one shell of the support shown in Fig. 4.
Figure 5:
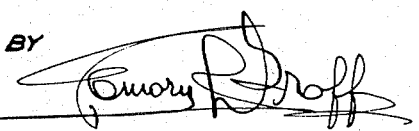

According to the method which is object of the invention, a fittings piece for example, or another piece with machinings having to be effected according to axes of rotation forming angles with each other, is machined in the following manner:

(1) The different machinings to be effected are divided into diverse phases of operations, each comprising several or all the machinings to be effected, according to one axis of rotation. It is evident, that it is advantageous to reduce the number of phases of operations as much as possible. For this purpose, it is of advantage to group in the same phase of operation all the operations to be effected according to one and the same axis of rotation, in as far as the characteristics of the available automatic lathe permit it;

(2) The piece 1 to be machined is placed in a support constructed with a view to the execution of one of the phases of operations, and constituted by two hollowed-out shells 2 (Figs. 2 to 5) in such a way as to be able to take the piece 1. The hollows of the shells have parts 3 intended to come into contact with the piece 1 in order to clamp the latter and to make it immovable in the support;

(3) The support is held in a fixing device 4 (Fig. 1) of the spindle 5 of the lathe by means of fixing members 6 with which the support is provided and which are intended to cooperate with the fixing members 7 carried on the fixing device 4;

(4) The fixing device 4 then automatically leads the support between the clamping members 8 of the spindle 5. These members close automatically on a part 9 of the support, concentric to the axis of rotation of the machinings to be effected, in order to fix the support in the spindle and to rotate it with the spindle, as well as to render the piece immovable in the support by bringing the parts 3 against the piece 1;

(5) The fixing device is then set automatically into the eclipsed position, and the tools of the lathe cut successively or simultaneously according to the series of operations provided for the execution of the machinings of the phase of operations in question;

(6) After executing all the machinings comprised in the phase of operation in question, the support and the piece 1 are automatically ejected from the spindle 5 by means of an ejection device (not shown) which is fitted in the automatic lathe;

(7) The piece is then taken in hand again to be placed in another support similar to the first but designed with a view to the execution of the machinings of the second phase of operations which may be effected either on the same automatic lathe after suitable adjustment, or on another automatic lathe;

(8) These operations are thus successively repeated until all the phases of operations provided have been executed.

The device for putting into practice the method described above, comprises a support constituted by two shells 2 having hollows intended to take the piece to be machined placed in a position permitting the execution of the machinings of the phase of operations in question. The parts 3 projecting with respect to the bottom of these hollows are intended to permit clamping of the piece 1 and rendering it immovable in the support by clamping the shells against each other. The support comprises also fixing members 6, intended to cooperate with corresponding fixing members 7 with which the fixing device 4 of the spindle 5 of the automatic lathe is provided. Finally, this support has a cylindrical part 9, coaxial with the axis of rotation of the machinings of the phase of operations in question. In the form of execution shown in Figs 2 and 3, the two shells of the support are hinged to each other at 10, whilst in the form of execution shown in Figs. 4 and 5, the two shells are each hinged at one of their ends on an intermediate piece 11.

A support formed of more than two shells could be provided, and the shells could not be provided with projecting parts 3, the hollows in this case being shaped in correspondence to the piece to be machined and mating with the part of the piece 1, which comes inside the shells.

The advantages possessed by the described method in comparison with the known methods of manufacture are considerable. In fact, not only can these pieces be machined without the help of lathes with rotating tools, but in addition the times for machining are reduced to an extent which is not negligible, since several machinings can be effected simultaneously and, on the other hand, the precision of concentricity and of coaxiality of the machinings is automatically ensured.

The sole manual work left to be done is the placing of the pieces into their supports and inserting the latter into the feed device of the automatic lathe. When the piece has to be drilled axially, it is advantageous to make use of an automatic turret lathe. At one or several of the places on the turret head provided for clamping a tool, fixing members can be fixed which are intended to receive the supports in view of inserting them automatically into the collets of the lathe spindle.

I claim:

1. A support for supporting a work piece during machining thereof requiring successive turning of the piece about one of several angularly related axes comprising at least two hollow shells connected together and having interior surfaces clampingly engaging the work piece to be machined, the exterior surfaces of the shells being cylindrical and adapting the support to be clamped in the rotatable spindle of an automatic lathe with the work piece clamped between the shells, and means on the shells for connecting the support to the automatic loading device of a single spindle automatic lathe.

2. The support according to claim 1 and wherein the connection between the shells is a hinge.

3. The support according to claim 1 and wherein the hollows of the shells are shaped to conjointly receive a work piece generally of circular cross section and representing substantially a quadrant of a ring.

4. The support according to claim 1 and wherein the hollows of the shells are shaped to conjointly receive a work piece having generally the shape of a cylinder and including a part extending at right angles to the axis of the cylinder.

ERNEST BODMER.

REFERENCES CITED

The following references are of record in the file of this patent:

UNITED STATES PATENTS

| Number | Name | Date |
|---|---|---|
| 303,643 | Johnson | Aug. 19, 1884 |
| 973,802 | Merrill | Oct. 25, 1910 |
| 1,514,580 | Floeter | Nov. 4, 1924 |
| 1,545,002 | Martin | July 7, 1925 |
| 1,865,558 | Clark | July 5, 1932 |
| 2,088,187 | Dempsey | July 27, 1937 |
| 2,350,065 | Parker | May 30, 1944 |
| 2,421,956 | McComb | June 10, 1947 |